United States Patent [19]
Meadows

[11] 3,820,409
[45] June 28, 1974

[54] ENDLESS POWER TRANSMISSION BELT

[75] Inventor: Roger D. Meadows, Waynesville, N.C.

[73] Assignee: Dayco Corporation, Dayton, Ohio

[22] Filed: May 2, 1973

[21] Appl. No.: 356,680

[52] U.S. Cl. ................................................ 74/233
[51] Int. Cl. ............................................. F16g 5/16
[58] Field of Search ............................. 74/233, 234

[56] References Cited
UNITED STATES PATENTS

| | | | |
|---|---|---|---|
| 2,446,310 | 8/1948 | Steinke | 74/233 |
| 2,690,985 | 10/1954 | Poole | 74/233 |
| 2,792,319 | 5/1957 | Fihe | 74/233 |
| 3,656,360 | 4/1972 | Fix | 74/234 |

*Primary Examiner*—Leonard H. Gerin

[57] ABSTRACT

A V-belt having a compression section, a tension section, and a longitudinally extending load-carrying cord arranged in a layer between said sections and wherein such belt has a plurality of closely spaced supporting cords arranged transverse to and on at least one side of the load-carrying cord and means holding the supporting cords parallel yet allowing free flexing movements of the belt in a direction perpendicular to the parallel transverse cords with the transverse cords providing crosswise rigidity and side edge support enabling the belt to be operated efficiently under comparatively high tension loads.

17 Claims, 4 Drawing Figures

PATENTED JUN 28 1974 3,820,409
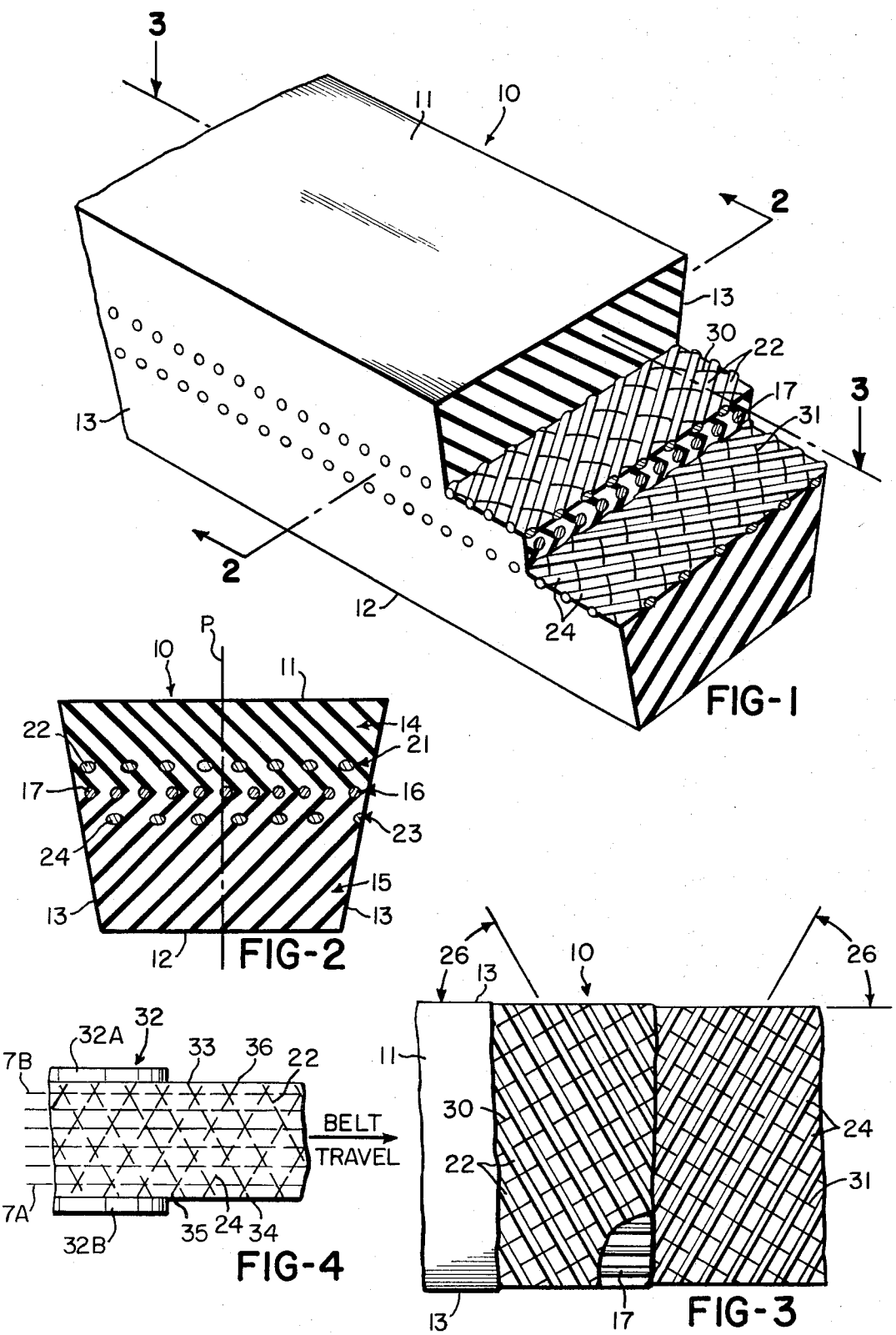

ENDLESS POWER TRANSMISSION BELT

BACKGROUND OF THE INVENTION

There are numerous endless power transmission belts or so-called V-belts of substantially trapezoidal cross-sectional configuration in current use. Many of these belts are used in applications where they are subject to high tension or high tensile loads due to the character of the load that they are expected to drive; and, for a belt operating under high tension it is important that such belt have sufficient crosswise rigidity to support the load-carrying cord of the belt and in particular the side edge cord windings of such load-carrying cord. However, the provision of sufficient crosswise rigidity in such a belt should not be at the expense of providing poor belt flexibility around its associated pulleys or sheaves.

The importance of providing crosswise rigidity in a high-tension belt will be readily understood when it is realized that the belt cross section tends to deform, i.e., squash, as each particular portion of the belt has its opposed side edges supported by associated groove-defining flanges of a sheave supporting the belt; and, greater loads are imposed on the outer windings of the load-carrying cord of such a belt. When each particular portion of the belt moves away from the sheave flanges, the belt cross section usually immediately resumes to its original shape whereby the individual cord windings of the load-carrying cord are more equally loaded. Accordingly, it will be appreciated that there is a sudden increase and decrease of the load particularly on the side edge cord windings of the load-carrying cord of a particular transmission belt as it respectively enters and leaves each of its associated sheaves during normal operation and such increase and decrease in load is in essence a cylic load which is repeated every time each particular portion of the belt enters and exits the sheaves whereby such cylic load tends to accelerate belt wear and reduce operating life.

Therefore, it is necessary to provide greater transverse support for the load-carrying cord of endless power transmission belts used in high tension drives; and, it is also desirable to reduce the suddenness with which a load is applied to the side edge cord windings of the endless load-carrying cord as each particular portion of a power transmission belt enters and exits an associated sheave.

SUMMARY

This invention provides an improved endless power transmission belt particularly adapted to be used in applications where it is subjected to high tension and such belt operates so that the loading of individual cord windings of a load-carrying cord for such belt at any cross section along the length of the belt is substantially equal even at a location where a particular portion of the belt is within an associated sheave for the belt. In particular, such belt has a compression section, a tension section, a longitudinally extending load carrying cord arranged in a layer between the sections, a plurality of closely spaced supporting cords arranged transverse to and on at least one side of the load-carrying cord, and means holding the supporting cords parallel yet allowing free flexing movements of the belt in a direction perpendicular to the parallel transverse cords with the transverse cords providing cross-wise rigidity and side edge support enabling the belt to be operated efficiently under comparatively high tension loads.

Other details, uses, and advantages of this invention will be readily apparent from the exemplary embodiment thereof presented in the following specification, claims, and drawing.

BRIEF DESCRIPTION OF THE DRAWING

The accompanying drawing shows an exemplary embodiment of this invention, in which FIG. 1 is a perspective view with parts in elevation, parts in cross section, and parts broken away particularly illustrating one exemplary embodiment of the belt of this invention;

FIG. 2 is a cross-sectional view taken essentially on the line 2—2 of FIG. 1;

FIG. 3 is a fragmentary plan view taken essentially on the line 3—3 of FIG. 1 and particularly illustrating the symmetrical arrangement of the transverse supporting cords arranged on opposite sides of the load-carrying cord of the belt; and FIG. 4 is a fragmentary plan view of the belt and a portion of the pulley illustrating the relationship of the supporting cords with the exit portion of the pulley. This figure is somewhat schematic in that some of the cords have been omitted for clarity.

DESCRIPTION OF ILLUSTRATED EMBODIMENT

Reference is now made to FIG. 1 of the drawing which illustrates one exemplary embodiment of an endless power transmission belt of this invention which is designated generally by the reference numeral 10. The belt 10 is popularly referred to as a V-belt and has a substantially trapezoidal cross-sectional and peripheral outline defined by a top wall 11 and a bottom wall 12 which are arranged in parallel relation and a pair of opposed side walls or nonparallel sides each designated by the same reference numeral 13. The belt 10 is what will be referred to as a high-tension belt because it is particularly adapted to be operated in associated pulleys or sheaves under comparatively high tension loads. The belt 10 is constructed so that it has optimum crosswise rigidity and is capable of operating in associated sheaves in a smooth manner with minimum or substantially no load fluctuations being imposed on its load-carrying section as each portion of the belt enters and exits associated pulleys or sheaves and for reasons which will be apparent hereinafter.

As seen in FIG. 2, the belt 10 comprises a tension section 14, a compression section 15, and a spirally wound load-carrying cord which is designated generally by the reference numeral 16 and is arranged between the tension section 14 and the compression section 15. The load-carrying cord is spirally wound so that it is arranged in a layer which is substantially parallel to the parallel walls 11 and 12 of the belt 10 and the cord 16 is comprised of a plurality of substantially parallel load-carrying cord windings 17 which extend longitudinally through the belt. The belt 10 is particularly adapted to be operated in a running plane P which in FIG. 2 is shown extending substantially vertically through the belt cross section and the plane P is determined by the placement of associated sheaves for the belt 10.

The belt 10 has a plurality of comparatively closely spaced transverse cords arranged on opposite sides of the load-carrying cord. In particular, the plurality of transverse cords include a layer 21 of parallel supporting cords 22 in the tension section 14 which are arranged adjacent the spirally wound load-carrying cord 16 and a layer 23 of parallel supporting cords 24 in the compression section which are arranged adjacent the spirally wound load-carrying cord 16.

The transverse cords 24 in the compression section 15 are arranged at a particular angle 26, see FIG. 3, to one side of the cord windings 17 of the load-carrying cord 16 and the transverse cords 2 in the tension section 14 are arranged substantially at the same angle 26 to the other side of the cord windings 17. Thus, the transverse cords 22 and 24 extend in a symmetrical pattern on opposite sides of the cord windings 17 and hence in a symmetrical pattern on opposite sides of the running plane P for the belt 10 whereby the belt 10 has improved crosswise rigidity as well as a balanced construction which assures efficient operation at high tension loads for a comparatively long service life.

The particular angle 26 at which the transverse cords 22 extend to one side and the transverse cords 24 to the opposite side of the cord windings or running plane P may vary depending upon the application of the belt 10 and the materials employed. Preferably such angle ranges between 45° and 80° from the cord windings 17 and hence the running plane P which also coincides with the longitudinal axis of the belt 10.

The belt 10 has suitable means for holding, the transverse cords 22 in the tension section 14 in parallel relation and also has means for holding the transverse cords 24 in the compression section in parallel relation. The cords 22 or 24 may be held in parallel relation by the elastomeric matrix material adjoining the cords; however, such cords preferably define the strength cords of a so called cord fabric often referred to in the art as "tire cord" fabric and the cords 22 have comparatively weak tie strands 30 holding them substantially parallel. Similarly, the cords 24 have comparatively weak tie strands 31 holding them substantially parallel.

Regardless of whether the cords 22 or 24 in each instance are held parallel by elastomeric matrix material or by weak tie strands, it will be appreciated that the matrix material or tie strands, as the case may be, allow free flexing movement of the belt in a direction perpendicular to each set of parallel supporting cords. Because of the placement of each set of transverse cords, either 22 or 24, at an angle ranging between 45° and 80° with the longitudinal axis of the belt, the overall belt flexibility as it moves around its associated pulleys is substantially undiminished even though the belt has comparatively great transverse rigidity.

The belt 10 may be fabricated or made using any suitable technique known in the art. Further, in the process of making such belt the layers 21 and 23 may be placed in position on opposite sides, i.e., above and below respectively, of the spirally wound load-carrying cord 16 using any technique known in the art. When each layer 21 and 23 is in the form of tire cord fabric, a layer of such fabric is simply wrapped in position around the building cylinder in the usual manner with the respective strength cords being placed at the desired angle.

By placing the transverse cords at an angle relative to the cord windings 17 of the spirally wound load-carrying cord 16, as each particular point or portion of the belt 10 engages and disengages the side flanges of each one of a plurality of sheaves or pulleys associated with the belt 10, substantially the same load is maintained on the individual cord windings 17 and in particular on the cord windings at opposite sides of the belt whereby the cord windings 17 at opposite sides of the belt are prevented from being loaded and unloaded suddenly or abruptly as in the case with belts which are not provided with the unique transverse cords in accordance with this invention.

This relationship is illustrated in FIG. 4, in which the belt 10 is making its exit from a typical pulley 32 comprising flanges 32A and 32B. It can be seen that each of the supporting cords 22 and 24 provides a transition from the pulley-contacting portion of the belt to the free portion. Thus, the trailing edges 33 of cords 22 are in contact with the inner surface of the pulley flange 32A while the leading edges 34 extend free of the pulley and serve to support the edge cord windings 17A which are adjacent. Similarly, the trailing edges 35 of cords 24 are in contact with the other pulley flange 32B, while the leading edges 36 support the opposite edge cord windings 17B. In this manner the shock loadings on the edge cords are decreased. A similar action occurs when the belt enters the pulley, whereby the cords 22 and 24 provide a transition from the free belt to the pulley flanges.

The belt 10 is illustrated in the drawing as a so-called raw edge belt, i.e., it is shown without a cover on any of its exposed surfaces; however, it will be appreciated that such belt 10 may be constructed so that any single surface, as associated pair of opposed surfaces, or the entire periphery of the belt may be covered with a suitable covering material. Further, any covering material employed may be in the form of a woven fabric, or the like, which may be suitably impregnated with an elastomeric material which is compatible with the elastomeric material used to make the belt 10.

To assure that the belt 10 has the desired cross-wise rigidity to enable such belt to be operated in applications where it is subjected to comparatively high tension as compared to ordinary endless power transmission belts, each cord 22 and 24 has a rigidity which is approximately equal to the rigidity of the load-carrying cord 16. In addition, it will be appreciated that the cords 22 and 24 have a strength, cross-sectional area, and rigidity which is of the order of many times greater than the corresponding strands of woven fabric proposed heretofore for use in endless power transmission belts for the purpose of affording some rigidity.

The endless power transmission belt 10 may be made of any suitable elastomeric material including natural rubber, synthetic rubber, or any suitable plastic material. Further, the load-carrying cord 16 may be made of any suitable material presently used in the manufacture of power transmission belts, or the like.

The cords 22 and 24 may, in each instance, be made of any suitable material including cotton, nylon, rayon, polyester and similar materials.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt comprising, a tension section, a compression section, a longitudinally extending load-carrying cord arranged between said sections, a plurality of cords arranged in parallel relation transverse to and on at least one side of said load-carrying cord, and means holding said transverse cords parallel yet allowing free flexing movements of said belt in a direction perpendicular to said transverse cords, said transverse cords being arranged at an angle ranging between 45° and 80° to said load-carrying cord and providing crosswise rigidity and side edge support enabling said belt to be operated under tension.

2. A belt as set forth in claim 1 in which said transverse cords are in said compression section.

3. A belt as set forth in claim 1 and further comprising a plurality of closely spaced cords arranged in parallel relation on the other side of said load-carrying cord and transverse thereto said plurality of cords on said one side being in said compression section and said plurality of cords on said other side being in said tension section.

4. A belt as set forth in claim 1 in which said transverse cords comprise strength cords of a cord fabric and said means holding said strength cords parallel is in the form of weak tie strands of said cord fabric.

5. A belt as set forth in claim 4 having a trapezoidal cross-sectional configuration and wherein said tension and compression sections are each made of an elastomeric material.

6. A belt as set forth in claim 4 in which said load-carrying cord is a spirally wound load-carrying cord and each of said plurality of transverse cords is arranged in an associated layer which is parallel to the parallel sides of said trapezoidal belt.

7. An endless power transmission belt comprising a tension section, a compression section, a spirally wound load-carrying cord arranged between said tension and compression sections and extending substantially longitudinally through said belt, a pair of layers on opposite sides of said load-carrying cord, one of said layers being in said tension section and the other being in said compression section, each of said layers comprising a plurality of supporting cords arranged in parallel relation transverse to said load-carrying cord; said transverse cords in said tension section being arranged at a particular angle to one side of said load-carrying cord and said transverse cords in said compression section being arranged at the same particular angle to the other side of said load-carrying cord, so that the supporting cords extend in a symmetrical pattern on opposite sides of said load-carrying cord to thereby provide crosswise rigidity as well as balance for said belt; and means holding the transverse cords in each layer parallel yet allowing free flexing movements of said belt in a direction perpendicular to the transverse cords of associated layers.

8. A belt as set forth in claim 7 having a substantially trapezoidal cross-sectional configuration and in which said tension and compression sections are each made of an elastomeric material.

9. A belt as set forth in claim 7 in which said particular angle at which each of said transverse cords is arranged ranges between 45° and 80°.

10. A belt as set forth in claim 9 in which said layer of cords in said tension section and said layer of cords in said compression section in each instance is defined by a cord fabric having strength cords which define said transverse cords.

11. A belt as set forth in claim 10 in which said means holding said transverse cords in each layer parallel comprise associated weak tie strands of the cord fabric.

12. A belt as set forth in claim 11 in which said belt is a raw edge belt free of a cover.

13. A belt as set forth in claim 11 in which each of said transverse cords has a rigidity which is approximately equal to the rigidity of the load-carrying cord.

14. An endless power transmission belt adapted to be operated in associated pulleys each having side flanges, said belt comprising a tension section, a compression section, a spirally wound load-carrying cord having a plurality of cord windings arranged in a layer between said tension and compression sections and extending substantially longitudinally through said belt, a plurality of cords arranged in parallel relation in a layer in said tension section and transverse said load-carrying cord, a plurality of cords arranged in parallel relation in a layer in said compression section and transverse to said load-carrying cord, and means holding the transverse cords in each layer parallel yet allowing free flexing movements of said belt in a direction perpendicular to the transverse cords of each layer, said transverse cords assuring that as each point of said belt engages and disengages the side flanges of each of said associated pulleys substantially the same loading is maintained on the cord windings of said load-carrying cord arranged at opposite sides of said belt.

15. A belt as set forth in claim 14 in which said transverse cords in said tension section are arranged at a particular angle to one side of said load-carrying cord and said transverse cords in said compression section are arranged at the same particular angle to the other side of said load-carrying cord, so that said supporting cords extend in a symmetrical pattern on opposite sides of said load-carrying cord to thereby provide crosswise rigidity as well as balance for said belt.

16. A belt as set forth in claim 15 in which said particular angle at which each of said transverse cords is arranged ranges between 45° and 80°.

17. A belt as set forth in claim 16 in which said layer of cords in said tension section and said layer of cords in said compression section in each instance is defined by a cord fabric having strength cords which define said transverse cords, and each of said transverse cords has a rigidity which is approximately equal to the rigidity of the load-carrying cord.

* * * * *